United States Patent [19]

Iwase et al.

[11] 4,407,179

[45] Oct. 4, 1983

[54] PROCESS AND APPARATUS FOR CUTTING AN ELONGATE COMPLEX STRUCTURE

[75] Inventors: Katsuhiko Iwase, Kaminoyama; Minoru Saito, Murayama, both of Japan

[73] Assignee: IG-Technical Research Inc., Higashine, Japan

[21] Appl. No.: 300,862

[22] Filed: Sep. 10, 1981

[30] Foreign Application Priority Data

Oct. 6, 1980 [JP] Japan .............................. 55-139618
Oct. 15, 1980 [JP] Japan .............................. 55-144165

[51] Int. Cl.³ .......................... B26D 1/00; B26D 3/00
[52] U.S. Cl. .................................... 83/865; 83/294; 83/320; 83/519; 83/869; 83/875
[58] Field of Search .................. 83/862–865, 83/869, 875–878, 881, 294, 319, 320, 380, 519, 37

[56] References Cited

U.S. PATENT DOCUMENTS 1,854,481 4/1932 Mudd ............................... 83/875 X
3,133,495 5/1964 DeMan ............................ 83/862 X Primary Examiner—James M. Meister
Attorney, Agent, or Firm—Flynn, Thiel, Boutell & Tanis

[57] ABSTRACT

Process and apparatus for cutting an elongate complex structure composed of materials having different properties, e.g. a liner and a core which are relatively soft and flexible and susceptible to rupture or crushing and a facing of hard material such as a metal plate. The facing may have an upwardly turned portion, flange portion and groove portion at each side thereof. A carriage and a base frame are movable in the direction of the travel of the complex structure and in the direction perpendicular thereto, respectively. Various types of cutters are mounted on the carriage. The complex structure is instantaneously cut in the direction of the width thereof while it is travelling at a high speed. The cut composite structure has smooth and fine cut edges, and is useful for e.g. a siding of a building.

41 Claims, 23 Drawing Figures

U.S. Patent   Oct. 4, 1983   Sheet 1 of 6   4,407,179
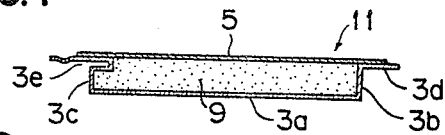
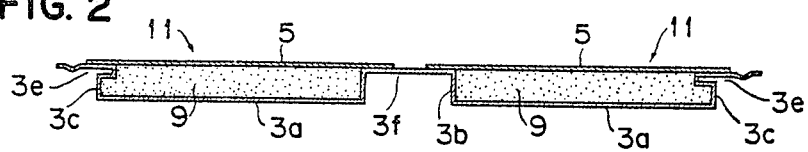
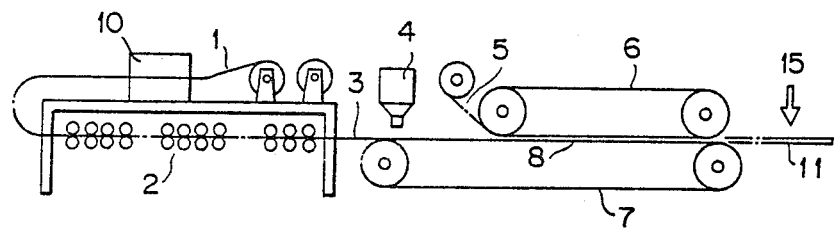
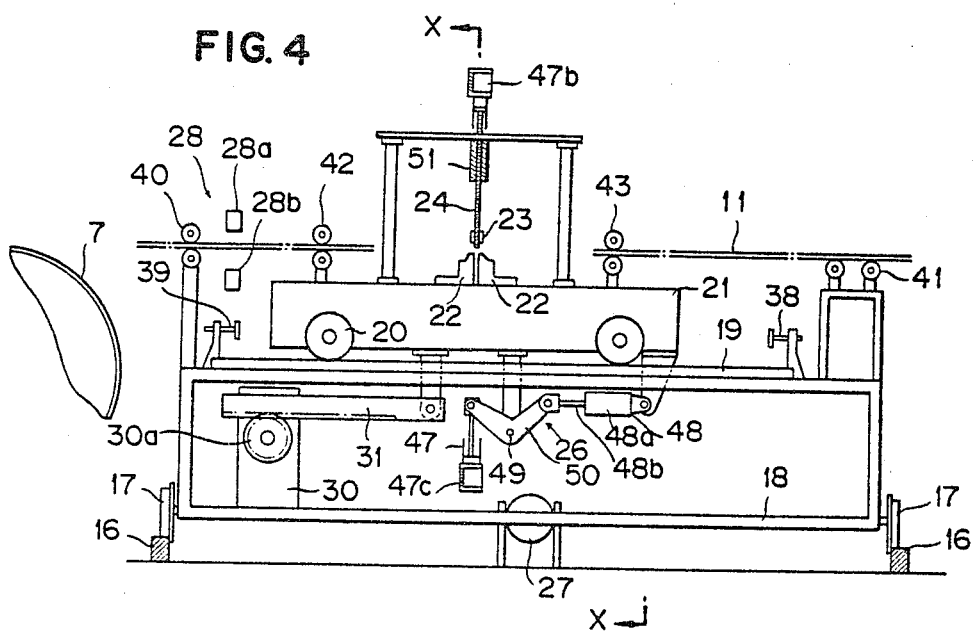

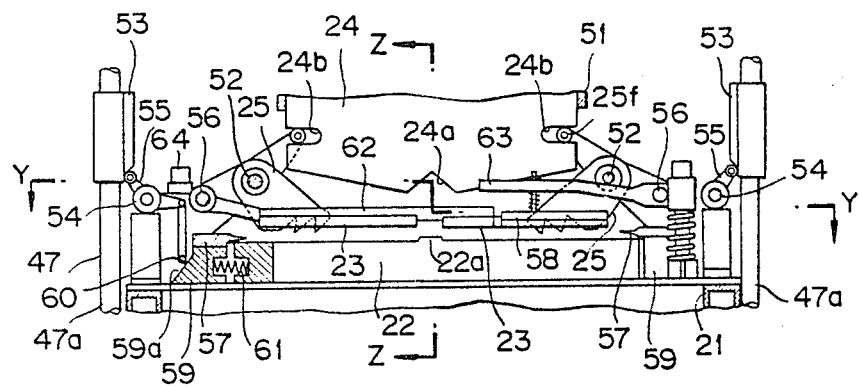

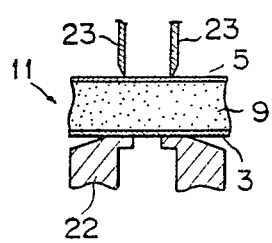
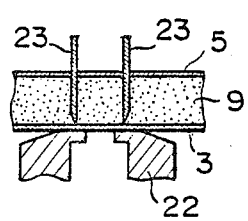
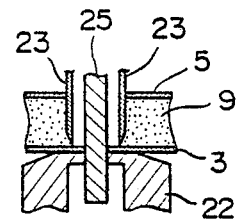
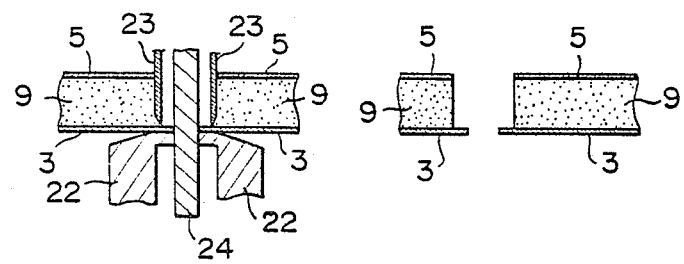
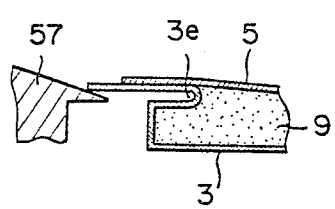
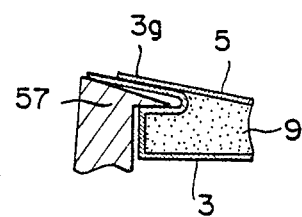

PROCESS AND APPARATUS FOR CUTTING AN ELONGATE COMPLEX STRUCTURE

BACKGROUND OF THE INVENTION

1. Field of the Invention

The present invention relates to a process and apparatus for cutting a continuously produced elongate complex structure in a predetermined length.

2. Description of the Prior Art

A complex structure such as the one used as a siding of a building, is required to be light in weight, easy for handling and convenient for application, and it is further required to have fire-proofing, heat insulating and sound-proofing properties. It is known to compose a complex structure of a facing of a metal, a core of a foamed synthetic resin and a liner having a water-proofing property. The complex structure has, along each side thereof, a complicatedly bent contour of a male or female engageable structure, so that a plurality of the complex structures can be joined side by side through a male-and-female engagement to form e.g. a wall siding of a building.

Thus, the complex structure is made by a combination of totally different materials, and it has a flange portion, a groove portion and an upwardly turned portion, along its both sides. Accordingly, it is extremely difficult to cut such a complex structure without deforming its shape.

Further, in its production, the complex structure is continuously issued from a forming machine in a form of elongate strip. It is, therefore, desired to cut it without stopping or slowing down the operation of the machine. However, there has been known no satisfactory method which satisfies the requirements that while allowing the complex structure to travel at a high speed, the cutting is done in a direction perpendicular to the direction of the travel of the complex structure without reducing the production efficiency, that the cutting is done to provide smooth and fine cut edges without reducing the yield or commercial value of the cut products, and that the cutting is done instantaneously to give smooth and fine cut edges. Under the circumstances, it has been usual that the operational speed of the machine is limited to a slow level.

SUMMARY OF THE INVENTION

Accordingly, it is an object of the present invention to provide a process and apparatus whereby it is possible to cut an elongate composition structure instantaneously at the outlet side of the complex structure-forming machine and to give smooth and fine cut edges. In a case where the forming machine is operated at an extremely high speed and the complex structure is desired to be cut in a short length, the complex structure is firstly cut in a long length (for instance, in a length a few times the desired length of the final product) and then cut in the desired length. In such a case, the apparatus of the present invention used for the second cutting may be located at an optional place in the plant.

Another object of the present invention is to provide a process and apparatus whereby it is possible to cut the elongate complex structure instantaneously in a direction perpendicular to the travel of the complex structure while the complex structure is continuously issued from the forming machine and travels at a high speed.

Other objects and features of the present invention will become apparent from the following description of a preferred embodiment of the present invention with reference to the accompanying drawings.

BRIEF DESCRIPTION OF THE DRAWINGS

FIGS. 1 and 2 are cross sectional views of complex structures to be cut by the process and apparatus of the present invention.

FIG. 3 is a diagramatic view illustrating an apparatus for forming a complex structure.

FIG. 4 is a side elevation of an apparatus of the present invention, with parts partially broken away.

FIG. 8 is an enlarged view of the main portion of the cutter arrangement of FIG. 5.

FIG. 9 is a cross sectional view taken along line Y—Y of FIG. 8.

FIG. 10 is an enlarged cross sectional view taken along line Z—Z of FIG. 8.

FIGS. 15A, 15B, 15C, 15D and 15E are enlarged cross sectional views illustrating the steps of the respective cutting operations.

FIGS. 16A and 16B are enlarged partial views illustrating the movement of the backing-up cutter.

DESCRIPTION OF THE PREFERRED EMBODIMENT

Figure 5:
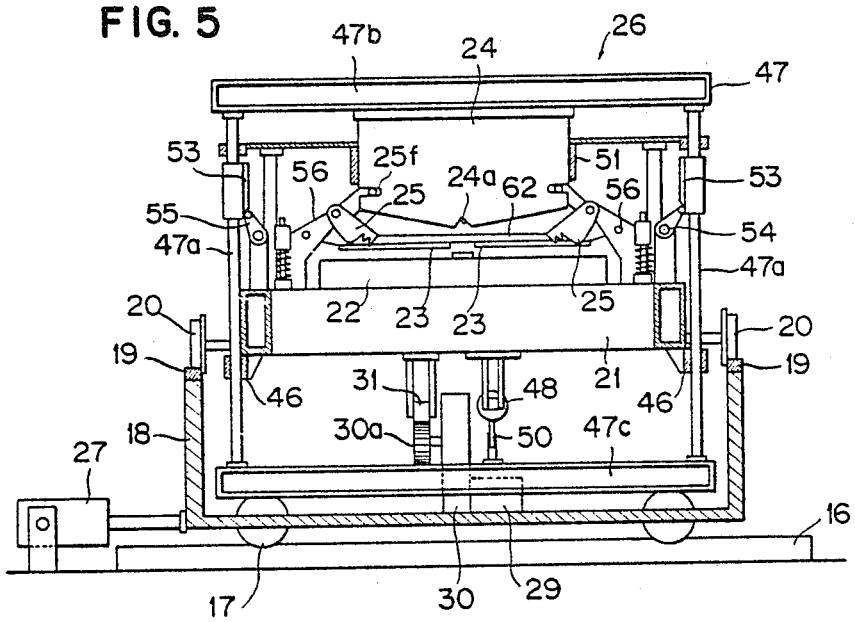
FIG. 5 is a cross sectional view taken along line X—X of FIG. 4.

Prior to a detailed description of the present invention, an example of the elongate complex structure to be cut according to the present invention will be explained. For instance, as shown in FIGS. 1 to 3, a complex structure 11 is composed of a facing 3 made of hard material such as a metal (for instance, a coloured steel plate coated with a resin), a core 9 of foamed material such as foamed materials of urethane resins, phenol resins, or epoxy resins (for instance, a closed cellular foamed material of a rigid urethane resin incorporated with granules such as pearlite and the like) a liner 5 of flexible water proof material such as a synthetic resin film, a water-proof paper, a metal foil or a laminated sheet thereof (for instance, an aluminum foil).

The complex structure 11 having such a composition is continuously produced at a factory. For instance, as shown in FIG. 3, a metal plate 1 such as a galvanized steel plate is unwound from its coiled state and shaped by the forming machine 2 into a facing 3 having a predetermined cross sectional shape. Then, a liquid material of a cold setting resin is applied to the facing 3 by a feeder 4, and thereafter a liner 5 is overlaid thereon. The whole structure is then sent to foaming zone 8 defined by a pair of upper and lower endless metal belts 6 and 7, where the above mentioned liquid material is foamed to form a core 9. A complex structure thus formed is then sent to a subsequent step (for instance, the cutting step intended by the present invention). When a coil of the above mentioned metal plate 1 is completely unwound, the rear end of the metal plate 1 is connected to the forward end of a metal plate of a new coil by a splicer 10 to form a so-called endless metal plate 1. Accordingly, during the operation of the complex structure-forming apparatus A, an endless elongate complex structure 11 is continuously issued from the apparatus A.

In this process, the facing 3 is supplied in an upside down state, and, as shown in FIG. 1, provided, along each side of its surface portion 3a, with an upwardly turned portion 3b, 3c, a flange portion 3d and a groove portion 3e formed by a bending processing, and a core 9 is filled therein and a liner 5 is placed thereon, to form a complex structure 11. Or, as shown in FIG. 2, two surface portions 3a, 3a are integrally connected at a connecting portion 3f in parallel with each other, and a core 9 and a liner 5 are applied to each surface portion, to form a pair of complex structures 11. The connecting portion 3f constitutes flange portions when it is subsequently severed.

For the purpose of the present invention, the term "complex structure" includes a pair of integral complex structures as well as a single complex structure.

The complex structure thus formed by the forming apparatus and issued from the foaming zone 8, is then cut in a predetermined length (for instance, about 3 m) in the direction of its width. In the case of the pair of complex structures as shown in FIG. 2, they are further severed longitudinally along the center line of the connecting portion 3f.

The flange portion 3d and the groove portion 3e at each side of the complex structure are designed for joining a plurality of complex structures side by side to form a wall siding or an outer facing of a builing. Namely, a flange portion 3d of a complex structure is designed to be inserted to a groove portion 3e of another complex structure to join the two complex structure, and in this manner, a plurality of complex structures may be joined as the case requires.

In the production of such a complex structure 11, it is possible to considerably increase the production efficiency by speeding up the supply of the facing 3 and the liner 5 in the forming apparatus A as shown in FIG. 3 and by shortening the time required for foaming the liquid material. For instance, it is possible to supply the facing 3 and the liner 5 at a speed as high as 30 m per minute. Accordingly, an interval in timing of the cutting is shortened with an increase of the travelling speed of the complex structure issued from the forming apparatus A. For instance, in order to cut the complex structure issued from the forming apparatus A at a high speed of 30 m/min in a length of every 3 m, it is necessary to operate the cutting apparatus at a cutting frequency of 10 times a minute.

Now, a preferred embodiment of the present invention will be described in detail.

The cutting apparatus comprises: a base frame 18 movable back and forth in a direction of the width of the complex structure 11 (i.e. towards and away direction in FIG. 4, or right and left direction in FIG. 5), with front and rear wheels 17 on rails 16 which are laid perpendicular to the length of the complex structure 11; a carriage 21 mounted on the base frame 18 and movable in the direction of the length of the complex structure 11, with right and left wheels 20 on rails 19 which are laid in parallel with the direction of the length of the complex structure 11 (i.e. right and left direction in FIG. 4); a lower cutter 22 secured to the carriage 21; three different types of upper cutters 23, 24 and 25 disposed thereabove and operable to perform the respective cutting operations; and a driving means 26 for the cutters.

The base frame 18 is driven for movement in the direction of the width of the complex structure (i.e. right and left direction in FIG. 5) by a prime mover 27 (i.e. third prime mover) comprising a hydraulic cylinder and placed on a floor surface on which the rails 16, 16 are laid. At each side of the rear portion of the base frame 18, there is provided a deflection detector 28 comprising a light source 28a and a photodetector 28b, whereby, when the complex structure 11 issued from the forming apparatus A is deflected to either right or left, the light from the light source 28a is shut off and a command pulse is sent out to switch the fluid-circuit (not shown) thereby actuating the prime mover 27 to move the base frame 18 to the deflected side, so that the light emitted from each side with a distance slightly wider than the width of the complex structure 11 always reaches the photodetectors 28b. By moving the base frame 18 to compensate the deflection of the complex structute 11 in the direction of the width thereof, it is possible to cut the complex structure 11 at right angle to the longitudinal direction thereof accurately in a predetermined length by the lower cutter 22 and the upper cutters 23, 24 and 25 mounted on the carriage 21 on the base frame 18. The prime mover 27 may be an electric motor. The detector 28 may be constructed to have a roller or the like which is in contact with one side or both sides of the complex structure 11 and which sences a frictional or pressure change caused by a deflection of the complex structure and sends out a corresponding signal to actuate the base frame 18 to move to compensate the deflection.

The carriage 21 is driven back and forth in the longitudinal direction of the complex structure 11 (right and left direction in FIG. 4) by a prime mover 29 (i.e. first prime mover) which is an electric motor mounted on the base frame 18. The rotation of the prime mover 29 is adjusted by a transmission 30, and a spur gear 30a attached to the output end of the prime mover is in engagement with a rack 31 disposed below the carriage 21 to move the carriage 21 back and forth.

Figure 6:
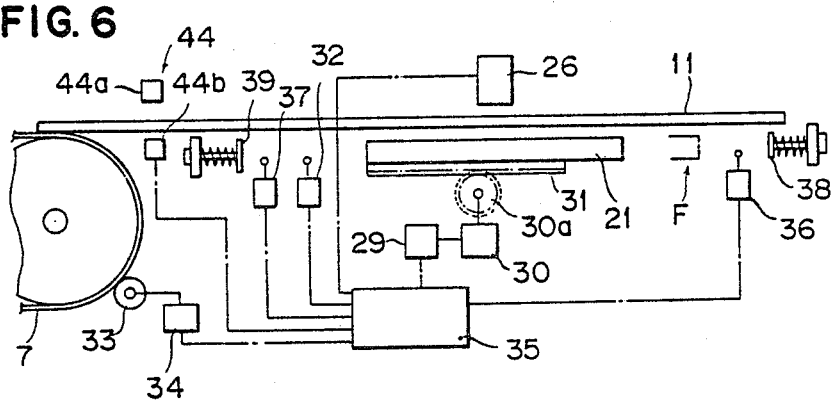
FIG. 6 is a schematic illustration of the control means for the driving means for a carriage and cutters.
Figure 7:
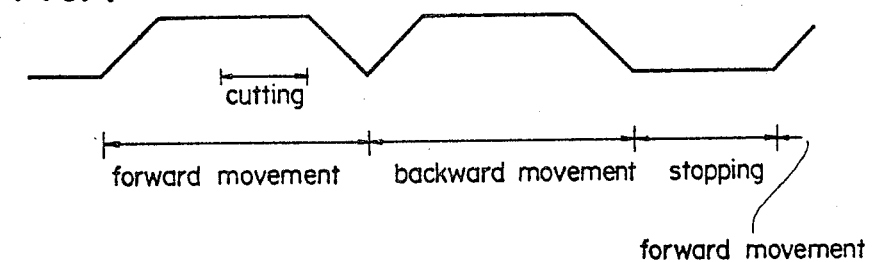
FIG. 7 is an illustration of the movement of the carriage.
Figure 11:
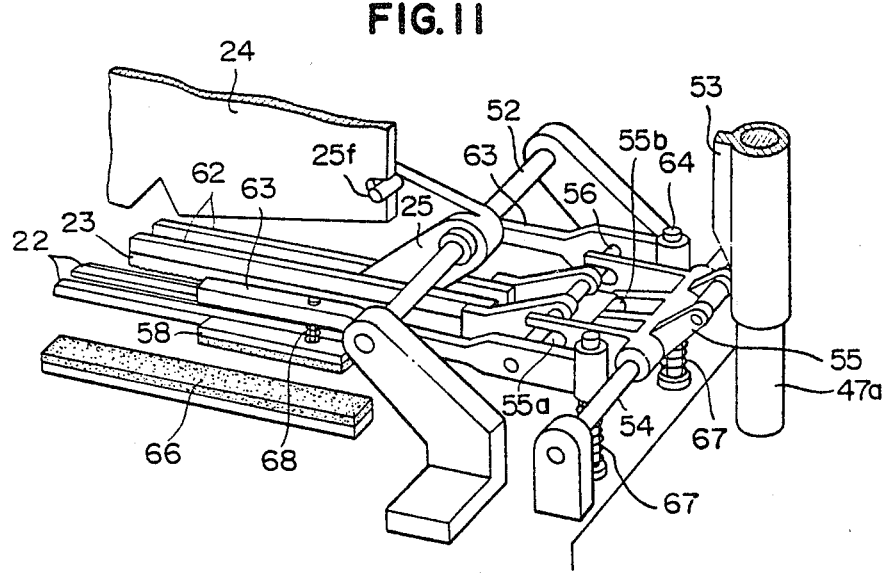
FIG. 11 is a perspective view of the main portion of the cutter arrangement.

The movement of this carriage 21 will be explained with reference to FIGS. 6 and 7. The carriage 21 stops when it gets in contact with a limit switch 32 for indicating the returning position, said limit switch 32 being mounted on the base frame 18. The length of the complex structure issued from the complex structure-forming apparatus A is calculated by a counter 34 from the number of rotations of a length detector 33 comprising a roller which rotates in contact with the metal strip 7 at the foaming zone 8 of the forming apparatus A. When the calculated length approaches a predetermined length, a command pulse to actuate the first prime mover 29 is sent from a control box 35 in response to a signal sent from the counter 34 to a microcomputer or other electronic control box 35, whereupon the carriage 21 is gradually accelerated and brought to move forward at the same speed as the travelling speed of the complex structure 11 when the length of the complex structure reaches the predetermined length. Shortly before the carriage 21 reaches the same speed as the complex structure 11, a command pulse to lower the upper cutters is sent from the control box 35 to the driving means 26, whereupon the upper cutters start to descend, followed by the cutting operation and the ascending of the cutters consecutively. Upon completion of the cutting operation, the carriage 21 is decelerated and then stops at a forward position shown at F in FIG. 6. Then, the first prime mover is reversely rotated by a command pulse sent from the control box 35, and the carriage 21 is moved back and gets in contact with a limit switch 32, whereupon it stops and stands ready for the next command pulse for forward movement. The length of the complex structure 11 is recalculated from zero starting at the time of the commencement or completion of the cutting operation or at an intermediate point of these timings, and thereafter the above mentioned operation is repeated. As an example, the time required for a single cycle of the return trip of the carriage 21 is about 3 seconds, and the time required for one cycle of the reciprocating motion of the upper cutters is about 0.5 second.

Further, limit switches 36 and 37 which send out an emergency stop signal to the control box 35 upon detection of an overrun of the carriage 21, and buffers 38 and 39 to prevent incidental overrun of the carriage 21, are provided at the forward and rear sides of the base frame 18. Furthermore, the complex structure 11 issued from the forming apparatus A is guided to travel in a predetermined plane by guide rolls 40, 41, 42 and 43 provided at the forward and rear sides of the carriage 21. A seam detector 44 comprising a pair of solenoid coils 44a and 44b (i.e. transmitting coil and receiving coil) opposedly facing to each other with the complex structure inbetween, is provided between the complex structure-forming apparatus and the base frame 18 or at the rear end of the carriage 21, and when a seamed portion of the facing 3, which has been produced at the time of joining the metal plates for the facing, passes therethrough, a signal corresponding to an increase of an overcurrent loss consumed by the facing 3 between the transmitting coil 44a and the receiving coil 44b, is sent to the control box 35, whereupon the cutting is carried out at a portion close to the seamed portion thereby minimizing a waste of the products. In this case, the waste is minimized by cutting a portion rearwardly close to the seamed portion, and thereafter, the cutting is conducted to give a predetermined length.

The upper cutters comprises: a pair of first upper cutters 23 arranged in parallel to each other in the direction of the width of the complex structure, with a narrow space inbetween, having a relatively thin, serrated cutting edge, and operable to cut mainly the liner 5 and the core 9; a second upper cutter 24 to cut the facing 3 mainly at its surface portion 3a; and third upper cutters 25 to cut the facing 3 mainly at its upwardly turned portions 3b and 3c, flange portions 3d and groove portions 3e. The second and third cutters 24 and 25 are relatively thick, and the third upper cutters 25 are symmetrically disposed at the right and left sides of the second upper cutter 24 and adapted to advance in the space between the pair of the first upper cutters 23. The cutting edge of each of the first upper cutters 23 is horizontal, the cutting edge of the second upper cutter 24 is inclined and each of the third cutters 25 has an outwardly and downwardly bulged arcuate first cutting edge 25a, and downwardly protruded angled second and third cutting edges 25b and 25c inside thereof (see FIG. 17).

The lower cutter 22 comprises a pair of lower cutter members which are attached to respective support bases 45 which are adjustably mounted on the carriage 21 to properly adjust the space between the lower cutter members. The lower cutter members are arranged in parallel to each other with a space therebetween which is substantially equal to the thickness of the second and third upper cutters 24 and 25 (see FIG. 10).

The embodiment of the cutting apparatus shown in FIGS. 4 to 18 represents a case wherein a pair of complex structures 11 connected at the connecting portion 3f as shown in FIG. 2, are simultaneously cut. The pair of the first upper cutters 23 are divided into two pairs of first upper cutter members at the right and left sides. The cutting edge of the second upper cutter 24 is angular with its center portion at the lowest position and with an inclination upwardly towards each side thereof so that the cutting starts from in the visinity of the connecting portion 3f, and a notch 24a is provided at the center for cutting the connecting portion 3f (see FIGS. 5 and 8). Further, the lower cutter 22 is provided at its center with a projection 22a on which the connecting portion 3f sits (see FIG. 8).

The driving means 26 comprises: poles 47a standing upright and supported by bearings 46 disposed at the right and left sides of the carriage 21; rectangular up-and-down frame 47 composed of beams 47b, 47c and attached at the top and lower ends of the poles (see FIG. 5); and a prime mover 48 (i.e. second prime mover) comprising a hydraulic cylinder disposed below the carriage 21, whereby a piston rod 48b extending from a cylinder 48a and the beam 47c are connected at a link 50 supported by a shaft 49 disposed below the carriage 21 (see FIG. 4), and the up-and-down frame 47 is driven for an up-and-down movement for a predetermined distance by the prime mover 48.

The second upper cutter 24 is attached to the upper beam 47b and guided by a guide 51 for an up-and-down movement without a deflection or vibration (see FIGS. 4, 5 and 8). The pair of the third upper cutters 25 are rotatably attached on shafts 52, and rollers or pins 25f attached to the ends of their base plates are fit in the right and left recesses 24b of the second upper cutter 24, respectively. Thus, the third upper cutters 25 rotate in association with the up-and-down movement of the second upper cutter 24 (see FIG. 8). A plate-shaped cam 53 is provided on the corresponding portion of each of the right and left poles 47a, and the base end of a link lever 55 rotatably supported by a shaft 54 provided on the carriage 21, is in contact with the cam 53. At each of the forward and rear forked portions 55a at the front ends of the link lever 55, a shaft 56 is journalled, whereby the shaft 56 is moved up-and-down as the link lever 55 contacting the cam 53 rotates in response to the up-and-down movement of the up-and-down frame 47 (see FIGS. 5, 8 and 9).

Figure 12:
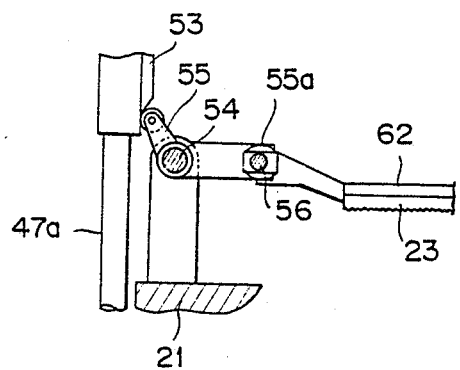
FIG. 12 is a partially cross sectional view showing the driving mechanism for first upper cutters.
Figure 13:
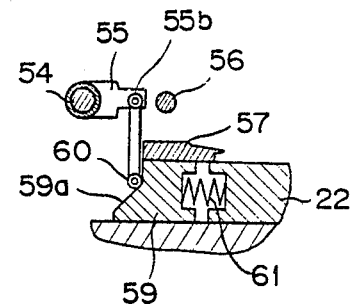
FIG. 13 is a partially cross sectional view showing the driving mechanism for a backing-up cutter.
Figure 14:
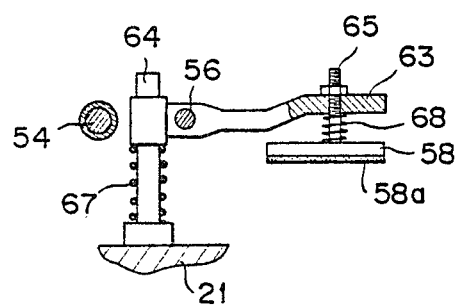
FIG. 14 is a partially cross sectional view showing the driving mechanism for upper press members.

The link lever 55 moves the backing-up cutter 57 to the right or left. When advanced, the backing-up cutter 57, supports the groove portion 3e at each side of the complex structure 11, from below at the forward and rear side of the cutting position. Further, the shaft 56 moves the upper press members 58 upwardly or downwardly, said upper press members 58 being operable to secure the complex structure 11 at the forward and rear sides of the first upper cutters 23 (see FIGS. 9 to 11). The backing-up cutter 57 is fixed to a sliding base 59 which is mounted on the upper surface of the carriage 21 and which is slidable in the right and left direction. A drive means 60 is upwardly and downwardly movably mounted on the carriage 21, with its lower end being in contact with a cam 59a of the outside surface of the sliding base 59 and with its upper end being in contact with a roll 55b supported by the link lever 55. When the drive means 60 is moved downwardly in response to the movement of the link lever 55, it advances the backing-up cutter 57 to the groove portion 3e, and thereafter the backing-up cutter 57 is returned to the initial position by the elasticity of the expansion spring 61 and stands ready for the next action (FIG. 13). The first upper cutters 23 are attached to respective supports 62 of rod shape which are connected at the respective ends with the right and left shafts 56 for an up-and-down movement (FIG. 12).

An arm 63 which is connected at its each end to the shaft 56 and which is disposed at each of the forward and rear sides of the first upper cutters 23, has both ends upwardly and downwardly movably fit on poles 64 standing up-right on the carriage 21 outside the shaft 56. The upper press members 58 are attached to lower ends of shafts 65 extending through and supported by the arms 63, and they are adapted to cooperate with the lower press members 66 disposed on the upper surface of the carriage 21, to clamp and secure the complex structure 11 (see FIGS. 9 to 11 and 14). The arm 63 is upwardly biased by a spring 67 provided around the pole 64. The distance between the upper press members 58 and the complex structure 11 can be adjusted by changing the length of the shaft 65 protruded from the arms 63. The upper press members 58 are downwardly biased by springs 68 provided arounds the shafts 65. Further, the upper and lower press members 58 and 66 are provided with cushions 58a and 66a made of rubber or a synthetic resin in order to avoid deforming or damaging (i.e. giving scars to) the complex structure 11.

When the length of the complex structure 11 issued from the complex structure-forming apparatus A as shown in FIG. 3 reaches a predetermined length, a corresponding signal is sent from the counter 34 to the control box 35, and a command pulse for descending is sent from the control box 35 to the driving means 26, whereupon a piston rod 48b of the prime mover 48 protrudes to lower the up-and-down frame 47 via the link 50, the link lever 55 rotates to lower the upper press members 58 and the first upper cutters 23 and at the same time the backing-up cutter 57 is advanced. At substantially the same time as the upper press members 58 clamp and secure the complex structure in cooperation with the lower press members 66, the first upper cutters 23 descend till they reach the liner 5 (see FIG. 15A). Further, as the pressure by the upper press members 58 increases due to the compression of the spring 68, the first upper cutters 23 further advance to cut the liner 5 and the core 9 and stop when they reach the back side of the facing 3 (see FIG. 15B). In parallel with this operation, the backing-up cutter 57 advances to the groove portion 3e (see FIG. 16A) and when the first upper cutters 23 stop, it enters the deepest position in the groove portion 3e and slightly pushes up and supports the flange portion 3g. In this position, the inner up-right surface of the backing-up cutter 57 is substantially in contact with the upwardly turned portion 3c (see FIG. 16B).

The second upper cutter 24 descends integrally with the up-and-down frame 47, and at the same time, the third upper cutters 25 which are associated with the second cutter 24 through the ends received in the recesses 24b of the second cutter, start to outwardly rotate about the shafts 52. Firstly, the third cutting edge 25c advances into the liner 5 and the core 9 to start the cutting between the pair of the first upper cutters 23, and then the second cutting edge 25b advances into the liner 5 and the core 9. After the third cutting edge 25c, the second cutting edge 25b and the concaved cutting edge 25d inbetween, cut the surface portion 3a of the facing 3, the second cutting edge 25b cuts the upwardly turned portion 3c (see FIG. 15C), and then the first cutting edge 25a cuts the groove portion 3e and the flange portion 3g.

Figure 17:
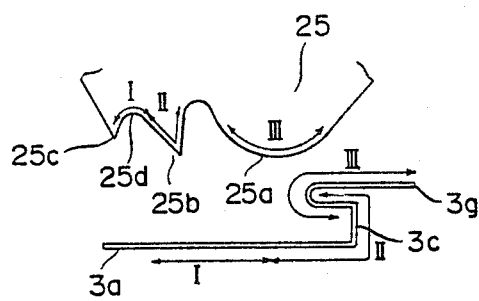
FIG. 17 is a diagramatic view illustrating the relationship between the third upper cutter and the portions to be cut.

The range of the facing 3 to be cut by the third upper cutters 25 is shown in FIG. 17 with identification of the corresponding parts by I, II and III. Namely, parts, I, II and III of the cutting edges cut parts I, II and III of the facing 3, respectively.

Shortly before the completion of the cutting by the third upper cutters 25, the second upper cutter 24 advances into the liner 5 and the core 9 between the pair of the first upper cutters 23 firstly in the vicinity of the connecting portion 3f of the complex structure 3, and then starts to cut the surface portion 3a. The cutting proceeds progressively towards each side and it is completed when the cutting proceeds to cutting positions at both sides, which slightly overlap the cutting positions of the third upper cutters 25 (FIG. 15D). When the up-and-down frame 47 reaches the down most position, it immediately starts to move upwardly, whereupon the second upper cutter 24 is retracted from the cutting position, the third upper cutters 25 rotate inwardly to retract from the cutting positions, and thereafter the retraction of the backing-up cutter 57, the retraction of the first upper cutters 23 from the cutting position and the release of the complex structure by the upward movement of the upper press members 58, occur successively. The cut edges of the complex structure thereby obtained are as shown in FIG. 15E.

Figure 18:
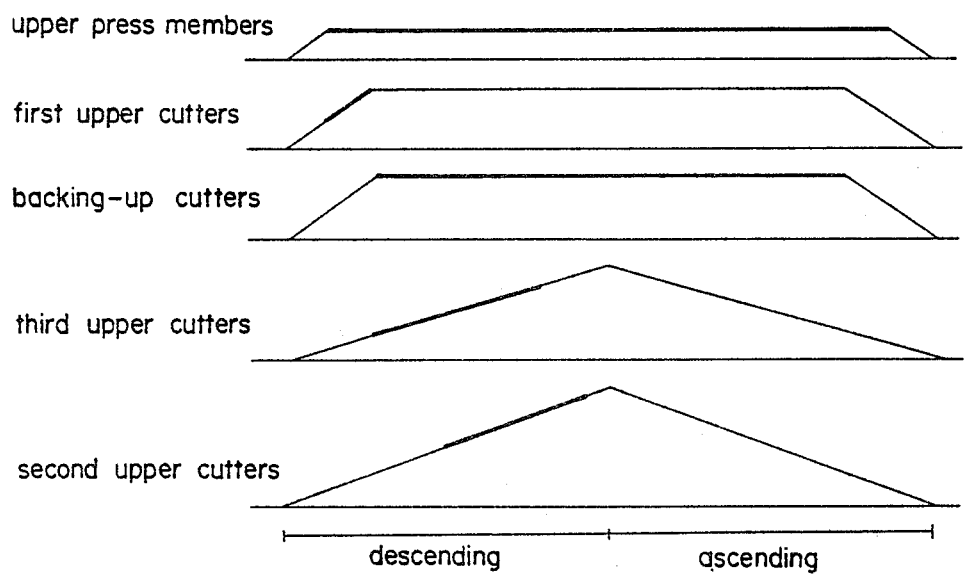
FIG. 18 is an illustration of the movements of various parts for the cutting operations.

The operational timings of various parts following the up-and-down movement of the up-and-down frame 47 are as shown in FIG. 18. The upper most position and the lower-most position of the up-and-down frame 47 are set by limit switches (not shown) mounted on the carriage 21. The prime mover 48 stops in response to a signal sent from the limit switches.

Scraps produced by the cutting are dropped through the space between the lower cutter members 22 and discharged below the carriage 21. If necessary, scraps may be forcibly discharged by blowing air against them.

In a case where a complex structure 11 having the construction shown in FIG. 1 is to be cut, the right and left backing-up cutters 57 push up the flange portion 3d and the groove portion 3e slightly, and the second upper cutter 24 advances into the liner 5 and the core 9 from the center portion and firstly cuts the center of the surface portion 3b, and then progressively cuts the surface portion towards each side thereof. The third upper cutters 25 cut the respective side portions in a manner as described above.

In a case where a complex structure has no upwardly turned portion, no flange portion and no groove portion at either side, it is of course unnecessary to provide the right and left sliding bases and the third upper cutters 25.

Further, in a case where the elongate complex structure is firstly cut in a desired length, and such a preliminarily cut complex structure is then cut in the desired final length at the outlet of the apparatus, the base frame 18 is unnecessary and the carriage 21 may be fixed to the floor of the factory. In this case, the up-and-down frame 47 to which the second upper cutter 24 is attached, may be manually operated for the up-and-down movement without using the driving means. Namely, the up-and-down frame 47 is held at the upper position by a spring force, and while inserting a complex structure 11 between the upper cutters 23, 24 and 25 and the lower cutters 23, the descending cutting operation is done e.g. by a foot. In this case, the backing-up cutter 57 and the lower cutters 22 may be formed integrally.

Having thus described the invention, it should be understood that with the process and apparatus of the present invention, it is possible to efficiently and instantaneously cut a complex structure composed by a combination of totally different materials, i.e. a combination of a facing of hard material such as a metal plate, a core of foamed material and a liner of flexible material. Further, it is thereby possible to obtain smooth and fine cut edges. Specifically, the following technical advantages and effects are thereby expected.

(1) The liner and the core which are relatively soft and flexible and susceptible to rupture and crushing, are cut by a pair of first upper cutters arranged in parallel to each other, whereby it is possible that the first upper cutters be made sufficiently thin so that the liner and the core of the complex structure can be cut without deformation in their cross sectional shapes, thus avoiding such an undesirable possibility as damaging the cut edges of the liner by pulling the cut portions at the time of cutting the liner or crushing the core material at the time of cutting the core;

(2) Then, the facing made of hard material is cut by a second upper cutter, wherein the cut edges formed by the preceding cutting operation by the first upper cutters, are shielded and protected by the pair of the first upper cutters, and the second upper cutter advances between the pair of the first cutters, whereby it is possible that the second upper cutter is made sufficiently thick and the facing can be cut effectively without affecting the cut edges of the liner and the core;

(3) Thus, the components of the complex structure having different properties are cut by different types of the upper cutters, whereby smooth and fine cross sectional cut edges are obtainable;

(4) Further, in the case where the complex structure has an upwardly turned portion, flange portion and groove portion, these portions are cut by third upper cutters which rotate in association with the movement of the second upper cutter, and the upwardly turned portion, flange portion and groove portion which are susceptible to crushing, are supported by a backing-up cutter, whereby it is possible to cut them without crushing the cut edges, thereby minimizing wastes due to cutting failures. Namely, the complex structure can be cut without forming irregular cut edges which reduce commercial values of the products;

(5) When the length of the complex structure continuously issued from the forming apparatus approaches to a predetermined length, the cutters are moved to the direction of the transfer of the complex structure, and when the length thereof reaches the predetermined length, the complex structure is cut in the direction of the width thereof while moving the cutters at the same speed as the travelling speed of the complex structure, whereby even when the complex structure is produced and issued at a high speed, it is possible to effectively cut it without slowing down the production speed, i.e. without reducing the production efficiency;

(6) Further, the upper cutters are mounted on a carriage which is movable back and forth in the direction of the transfer of the complex structure, and the carriage is mounted on a base frame which is movable to compensate the deflection of the complex structure in the direction of the width thereof, whereby the upper cutters are always located accurately at their respective cutting positions relative to the complex structure, and the complex structure is thereby cut accurately at the predetermined portion, and thus it is possible to eliminate a disadvantage that a non-cut portion will be left; and (7) Further, with use of the lower cutters, it is possible to prevent formation of bents, deformations or frictional scars at the cut edges of the facing or therearound.

What is claimed is:

1. A process for cutting a complex structure composed of a facing of hard material, a core of foamed material and a liner of flexible material, which comprises cutting the liner and the core by a pair of first upper cutters (23) arranged in parallel with each other in the direction of the width of the complex structure, then advancing a second upper cutter (24) between the pair of the first cutters (23) to cut the facing, and retracting the first and second cutters (23) and (24) from the respective cutting positions.

2. A process for cutting a complex structure composed of a facing of hard material, a core of foamed material and a liner of flexible material, which comprises cutting the liner and the core by a pair of first upper cutters (23) arranged in parallel with each other in the direction of the width of the complex structure, then advancing a second upper cutter (24) and a pair of third upper cutters (25) between the pair of the first cutters (23) to cut the facing at its surface portion by the second upper cutter (24) and at its upwardly turned portion, flange portion and groove portion at each side of thereof by the respective third cutters (25), and retracting the first, second and third upper cutters (23), (24) and (25) from the respective cutting positions.

3. The process as claimed in claim 1 or 2, wherein the first and second upper cutters (23) and (24) are respectively linearly reciprocated for cutting in a plane at right angle to the longitudinal direction of the complex structure.

4. The process as claimed in claim 2, wherein the third upper cutters (25) are rotationally reciprocated for cutting in association with the second upper cutter (24).

5. The process as claimed in claim 1 or 2, wherein the second upper cutter (24) cuts the facing in cooperation with a lower cutter (22) arranged to pinch the facing with the second upper cutter (24).

6. The process as claimed in claim 1 or 2, wherein the second upper cutter (24) cuts the facing firstly at the center thereof and then progressively towards each side thereof.

7. The process as claimed in claim 1 or 2, wherein the cutting is carried out while securing the complex structure with press members at forward and rear sides of the cutting portion.

8. The process as claimed in claim 2, wherein the cutting by the third upper cutters (25) is carried out while supporting the complex structure at its flange portion and groove portion with a backing-up cutter (57) at forward and rear sides of the cutting portion.

9. The process as claimed in claim 2, wherein the cutting by the third upper cutters (25) commences upon completion of the cutting by the first upper cutters (23) and finally the cutting by the second upper cutter (24) commences.

10. A process for cutting a complex structure composed of a facing of hard material, a core of foamed material and a liner of flexible material, which is characterized in that:

when the length of the complex structure continuously issued from a complex structure-forming apparatus approaches close to a predetermined length, a pair of first upper cutters (23) arranged in parallel to each other in the direction of the width of the complex structure and a second upper cutter (24) arranged between the pair of the first upper cutters (23), are moved in the direction of the travel of the complex structure;

when the length of the complex structure reaches the predetermined length, while moving the first and second upper cutters (23) and (24) at the same speed as the travelling speed of the complex structure, the liner and the core are cut by the first upper cutters (23), then the second upper cutter (24) is advanced between the pair of the first upper cutters (23) to cut the facing and thereafter the first and second upper cutters (23) and (24) are retracted from the respective cutting positions; and the movement of the first and second upper cutters (23) and (24) is stopped and they are then returned to their initial positions.

11. A process for cutting a complex structure composed of a facing of hard material, a core of foamed material and a liner of flexible material, which comprises steps in that:

when the length of the complex structure continuously issued from a complex structure-forming apparatus approaches close to a predetermined length, a pair of first upper cutters (23) arranged in parallel to each other in the direction of the width of the complex structure and a second upper cutter (24) and a pair of third upper cutters (25) arranged between the pair of the first upper cutters (23), are moved in the direction of the travel of the complex structure;

when the length of the complex structure reaches the predetermined length, while moving the first, second and third cutters (23), (24) and (25) at the same speed as the travelling speed of the complex structure, the liner and the core are cut by the first upper cutters (23), then the second and third upper cutters (24) and (25) are advanced between the pair of the first cutters (23) to cut the facing at its surface portion by the second upper cutter (24) and at its upwardly turned portion, flange portion and groove portion at each side of the facing by the third upper cutters (25), and thereafter the first, second and third upper cutters (23), (24) and (25) are retracted from the respective cutting positions; and the movement of the first, second and third upper cutters (23), (24) and (25) is stopped and they are then returned to their initial positions.

12. The process as claimed in claim 10 or 11, wherein the first and second upper cutters (23) and (24) are respectively linearly reciprocated for cutting in a plane at right angle to the travelling direction of the complex structure.

13. The process as claimed in claim 11, wherein the third upper cutters (25) are rotationally reciprocated for cutting in association with the second upper cutter (24).

14. The process as claimed in claim 10 or 11, wherein the second upper cutter (24) cuts the facing in cooperation with a lower cutter (22) arranged to pinch the facing with the second upper cutter (24).

15. The process as claimed in claim 10 or 11, wherein the second upper cutter (24) cuts the facing firstly at the center of the facing and then progressively towards each side thereof.

16. The process as claimed in claim 10 or 11, wherein the cutting is carried out while securing the complex structure with press members at forward and rear sides of the cutting portion.

17. The process as claimed in claim 11, wherein the cutting by the third upper cutters (25) is carried out while supporting the complex structure at its flange portion and groove portion with a backing-up cutter (57) at forward and rear sides of the cutting portion.

18. The process as claimed in claim 11, wherein the cutting by the third upper cutters (25) commences upon completion of the cutting by the first upper cutters (23), and finally the cutting by the second upper cutter (24) commences.

19. The process as claimed in claim 11, wherein firstly the complex structure is secured by press members at forward and rear sides of the cutting position in association with the approaching operation of the first and second upper cutters (23) and (24) towards the complex structure, then while carrying out the cutting by the first upper cutters (23), a backing-up cutter (57) is moved towards the flange portion and the groove portion of the facing so that upon completion of the cutting by the first upper cutters (23), the backing-up cutter (57) engages and supports the flange portion and the groove portion, the cutting by the second upper cutter (24) commences after the commencement of the cutting by the third upper cutters (25), upon completion of the cutting by the second and third upper cutters (24) and (25), firstly the second upper cutter (24) and then the third upper cutters (25) are retracted from the respective cutting positions, and thereafter, the retraction of the backing-up cutter (57), the retraction of the first upper cutters (23) from the cutting position, and the releasing the complex structure from the press members, are successively carried out.

20. An apparatus for cutting a complex structure composed of a facing of hard mmaterial, a core of foamed material and a liner of flexible material, which comprises:

a pair of first upper cutters (23) arranged in parallel to each other in the direction of the width of the complex structure and operable to cut the liner and the core of the complex structure;

a second upper cutter (24) arranged between the pair of the first upper cutters (23) and operable to cut the facing of the complex structure; and a lower cutter (22) to cut the facing in cooperation with the second upper cutter (24);

said first and second upper cutters being operable in association with each other and in a linear reciprocating motion against the lower cutter (22).

21. An apparatus for cutting a complex structure composed of a facing of hard material, a core of foamed material and a liner of flexible material, which comprises:
- a pair of first upper cutters (23) arranged in parallel to each other in the direction of the width of the complex structure and operable to cut the liner and the core of the complex structure;
- a second upper cutter (24) arranged between the pair of the first upper cutters (23) and operable to cut the facing at its surface portion;
- a third upper cutters (25) disposed at each side of the second upper cutter (24) and operable to cut the facing at its upwardly turned portion, flange portion and groove portion at each side of the facing;
- a lower cutter (22) to cut the facing in cooperation with the second upper cutter (24);
- a backing-up cutter (57) to cut the facing at its flange portion and groove portion in cooperation with the third upper cutter (25);
- said first and second upper cutters (23) and (24) being operable in association with each other and in a linear reciprocating motion against the lower cutter (22), and said third upper cutter (25) being operable in association with said second upper cutter (24) and in a rotationally reciprocating motion against said backing-up cuttter (57).

22. An apparatus for cutting a complex structure composed of a facing of hard material, a core of foamed material and a liner of flexible material, which comprises:
- a pair of first upper cutters (23) arranged in parallel to each other in the direction of the width of the complex structure and operable to cut the liner and the core of the complex structure;
- a second upper cutter (24) arranged between the pair of the first upper cutters (23) and operable to cut the facing of the complex structure;
- a lower cutter (22) to cut the facing in cooperation with the second upper cutter (24); and
- upper and lower press members (58) and (66) arranged at forward and rear sides of the first upper cutters (23) and the lower cutter (22), respectively, and adapted to clamp the complex structure inbetween;
- said first and second upper cutters (23) and (24) and said upper press members (58) being operable in association with one another and in a linear reciprocating motion against said lower cutter (22).

23. An apparatus for cutting a complex structure composed of a facing of hard material, a core of foamed material and a liner of flexible material, which comprises:
- a pair of first upper cutters (23) arranged in parallel to each other in the direction of the width of the complex structure and operable to cut the liner and the core of the complex structure;
- a second upper cutter (24) arranged between the pair of the first cutters (23) and operable to cut the facing at its surface portion;
- a third upper cutter (25) disposed at each side of the second upper cutter (24) and operable to cut the facing at its upwardly turned portion, flange portion and groove portion at each side of the facing;
- a lower cutter (22) to cut the facing in cooperation with the second upper cutter (24);
- a backing-up cutter (57) to cut the facing at its flange portion and groove portion in cooperation with the third upper cutter (25);
- upper and lower press members (58) and (66) arranged at forward and rear sides of the first upper cutters (23) and the lower cutter (22), respectively, and adapted to clamp the complex structure inbetween;
- said first and second upper cutters (23) and (24) and said upper press members (58) being operable in association with one another and in a linear reciprocating motion against said lower cutter (22), and said third upper cutter (25) being operable in association with said second upper cutter (24) and in a rotationally reciprocating motion against said backing-up cutter (57).

24. The apparatus as claimed in any one of claims 20 to 23, wherein the pair of the first upper cutters (23) are disposed with a little space inbetween, and have a serrated cutting edge.

25. The apparatus as claimed in any one of claims 20 to 23, wherein the second upper cutter (24) has an angular cutting edge with its center portion closest to the lower cutter (22).

26. The apparatus as claimed in claim 21 or 23, wherein the third upper cutter (25) has an arcuate first cutting edge (25a) to cut mainly the flange portion and the groove portion, an angled second cutting edge (25b) to cut mainly the upwardly turned portion, and an angled third cutting edge (25c) to cut mainly the surface portion.

27. The apparatus as claimed in claim 21 or 23, wherein the backing-up cutter (57) is movable in the direction of the width of the complex structure in association with the operation of the first and second upper cutters (23) and (24).

28. The apparatus as claimed in claim 21 or 23, wherein the backing-up cutter (57) is integrally formed with the lower cutter (22).

29. An apparatus for cutting a complex structure composed of a facing of hard material, a core of foamed material and a liner of flexible material, which comprises:
- a carriage (21) located at the outlet of a complex structure-forming apparatus and movable back and forth in the direction of the travel of the complex structure;
- a pair of first upper cutters (23) upwardly and downwardly movably mounted on the carriage (21), arranged in parallel to each other in the direction of the width of the complex structure and operable to cut the liner and the core;
- a second upper cutter (24) arranged between the pair of the first upper cutters (23) and operable to cut the facing at its surface portion;
- a first prime mover (29) for moving the carriage (21);
- a second prime mover (48) for upwardly and downwardly moving the first and second upper cutters (23) and (24);
- a length detector (33) for detecting the length of the complex structure issued from the complex structure-forming apparatus; and
- a control box (35) for generating a command pulse to actuate or stop each of the prime movers (29) and (48) in response to a signal sent from the length detector (33).

30. An apparatus for cutting a complex structure composed of a facing of hard material, a core of foamed material and a liner of flexible material, which comprises:

a base frame (18) located at the outlet of a complex structure-forming apparatus and movable back and forth in the direction of the width of the complex structure;

a carriage (21) mounted on the base frame (18) and movable back and forth in the direction of the travel of the complex structure;

a pair of first upper cutters (23) upwardly and downwardly movably mounted on the carriage (21), arranged in parallel to each other in the direction of the width of the complex structure and operable to cut the liner and the core of the complex structure;

a second upper cutter (24) arranged between the pair of the first upper cutters (23) and operable to cut the facing of the complex structure;

a third prime mover (27) for moving the base frame (18);

a first prime mover (29) for moving the carriage (21);

a second prime mover (48) for upwardly and downwardly moving the first and second upper cutters (23) and (24);

a deflection detector (28) for detecting a deflection, in the direction of the width, of the complex structure issued from the complex structure-forming apparatus and actuating the base frame (18) to move to compensate the deflection;

a length detector (33) for detecting the length of the complex structure issued from the complex structure forming apparatus;

a control box (35) for generating a command pulse to actuate or stop each of the prime movers (29) and (48) in response to a signal sent from the length detector (33).

31. An apparatus for cutting a complex structure composed of a facing of hard material, a core of foamed material and a liner of flexible material, which comprises:

a carriage (21) located at the outlet of a complex structure-forming apparatus and movable back and forth in the direction of the travel of the complex structure;

a pair of first upper cutters (23) upwardly and downwardly movably mounted on the carriage (21), arranged in parallel to each other in the direction of the width of the complex structure and operable to cut the liner and the core of the complex structure;

a second upper cutter (24) arranged between the pair of the first upper cutters (23) and operable to cut the facing at its surface portion;

a third upper cutter (25) operable to rotationally reciprocate in association with the up-and-down movement of the second upper cutter (24) and to cut the facing at its upwardly turned portion, flange portion and groove portion;

a first prime mover (29) for moving the carriage (21);

a second prime mover (48) for upwardly and downwardly moving the first and second upper cutters (23) and (24);

a length detector (33) for detecting the length of the complex structure issued from the complex structure-forming apparatus;

a control box (35) for generating a command pulse to actuate or stop each of the prime movers (29) and (48) in response to a signal sent from the length detector (33).

32. An apparatus for cutting a complex structure composed of a facing of hard material, a core of foamed material and a liner of flexible material, which comprises:

a base frame (18) located at the outlet of a complex structure-forming apparatus and movable back and forth in the direction of the width of the complex structure;

a carriage (21) mounted on the base frame (18) and movable back and forth in the direction of the travel of the complex structure;

a pair of first upper cutters (23) upwardly and downwardly movably mounted on the carriage (21), arranged in parallel to each other in the direction of the width of the complex structure and operable to cut the liner and the core of the complex structure;

a second upper cutter (24) arranged between the pair of the first upper cutters (23) and operable to cut the facing at its surface portion;

a third upper cutter (25) operable to rotatably reciprocate in association with the up-and-down movement of the second upper cutter (24) and to cut the facing at its upwardly turned portion, flange portion and groove portion;

a third prime mover (27) for moving the base frame (10);

a first prime mover (29) for moving the carriage (21);

a second prime mover (48) for upwardly and downwardly moving the first and second upper cutters (23) and (24);

a deflection detector (28) for detecting a deflection, in the direction of the width, of the complex structure issued from the complex structure-forming apparatus and actuating the base frame (18) to move to compensate the deflection;

a length detector (33) for detecting the length of the complex structure issued from the complex structure-forming apparatus; and a control box (35) for generating a command pulse to actuate or stop each of the prime movers (29) and (48) in response to a signal sent from the length detector (33).

33. The apparatus as claimed in any one of claims 29 to 32, wherein a lower cutter (22) to cut the facing of the complex structure in cooperation with the second upper cutter (24) is mounted on the carriage (21).

34. The apparatus as claimed in claim 31 or 32, wherein a backing-up cutter (57) to support the facing at its flange portion and groove portion at the forward and rear sides of the cutting position and to cut the facing at said portions in cooperation with the third upper cutter (25), is mounted on the carriage (21) movably in the direction of the width of the complex structure.

35. The apparatus as claimed in any one of claims 29 to 32, wherein there are provided upper press members (58) upwardly and downwardly movable in association with the first and second upper cutters (23) and (24) to clamp the complex structure at the forward and rear sides of the cutting position, and lower press members (66) mounted on the carriage (21).

36. The apparatus as claimed in any one of claims 29 to 32, wherein the first prime mover (29) for moving the carriage back and forth is an electric motor.

37. The apparatus as claimed in any one of claims 29 to 32, wherein the second prime mover (48) for upwardly and downwardly moving the first and second upper cutters (23) and (24) is a hydraulic cylinder.

38. The apparatus as claimed in claim 30 or 31, wherein the third prime mover (27) for moving the base frame (18) is a hydraulic cylinder.

39. The apparatus as claimed in any one of claims 29 to 32, wherein there is provided a seam detector (44) for detecting a seam of the facing of the complex structure, and sending a corresponding signal to the control box (35) so that the complex structure is cut at a portion close to the seam.

40. The apparatus as claimed in any one of claims 29 to 32, wherein there is provided a limit switch (36) for detecting an overrun of the carriage (21) and sending an emergency stop signal to the control box (35).

41. The apparatus as claimed in any one of claims 29 to 32, wherein there are provided buffers (38) and (39) to prevent an incidental overrun of the carriage (21).

* * * * *